(12) United States Patent
Ukai et al.

(10) Patent No.: US 12,363,493 B2
(45) Date of Patent: Jul. 15, 2025

(54) AUDIO SIGNAL PROCESSING METHOD AND AUDIO SIGNAL PROCESSING DEVICE

(71) Applicant: YAMAHA CORPORATION, Hamamatsu (JP)

(72) Inventors: Satoshi Ukai, Hamamatsu (JP); Masashi Suzuki, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 246 days.

(21) Appl. No.: 18/179,484

(22) Filed: Mar. 7, 2023

(65) Prior Publication Data

US 2023/0300553 A1 Sep. 21, 2023

(30) Foreign Application Priority Data

Mar. 18, 2022 (JP) .................................. 2022-043931

(51) Int. Cl.
*H04S 7/00* (2006.01)
*G06V 10/44* (2022.01)
*G06V 20/50* (2022.01)
*H04S 3/00* (2006.01)

(52) U.S. Cl.
CPC .............. *H04S 7/301* (2013.01); *G06V 20/50* (2022.01); *H04S 3/008* (2013.01); *H04S 7/305* (2013.01); *G06V 10/44* (2022.01); *H04S 2400/01* (2013.01); *H04S 2400/13* (2013.01); *H04S 2400/15* (2013.01)

(58) Field of Classification Search
CPC .......... H04S 7/301; H04S 3/008; H04S 7/305; H04S 2400/01; H04S 2400/13; H04S 2400/15; H04S 7/00; H04S 3/00; G06V 20/50; G06V 10/44; G10L 2021/02082; G10L 21/0208; G10L 21/02; H04R 3/00; H04R 2430/00

See application file for complete search history.

(56) References Cited

U.S. PATENT DOCUMENTS 10,721,521 B1 7/2020 Robinson et al.
2011/0268288 A1 11/2011 Tanaka
2018/0090152 A1 3/2018 Ichimura
(Continued)

FOREIGN PATENT DOCUMENTS

JP 2010122617 A 6/2010
JP 2011151634 A 8/2011
(Continued)

OTHER PUBLICATIONS

Extended European search report issued in European Appln. No. 23161172.4, mailed on Jul. 25, 2023.
(Continued)

*Primary Examiner* — Yosef K Laekemariam
(74) *Attorney, Agent, or Firm* — ROSSI, KIMMS & McDOWELL LLP

(57) ABSTRACT

The audio signal processing method in accordance with one embodiment receives an audio signal, obtains a first image, estimates room information based on the obtained first image, sets an acoustic parameter according to the estimated room information, applies sound processing to the audio signal according to the set acoustic parameter, and outputs the audio signal subjected to the sound processing.

18 Claims, 14 Drawing Sheets

(56) References Cited

U.S. PATENT DOCUMENTS

2019/0028829 A1    1/2019  R et al.
2021/0136510 A1    5/2021  Tang et al.
2022/0114995 A1    4/2022  Kuthuru et al.

FOREIGN PATENT DOCUMENTS

| WO | 2020261250 A1 | 12/2020 | | |
| WO | WO 2020261250 | * 12/2020 | .............. | H04S 7/00 |
| WO | 2021002864 A1 | 1/2021 | | |
| WO | WO 2021/002864 | * 1/2021 | | |

OTHER PUBLICATIONS

Singh et al. "Image2Reverb: Cross-Modal Reverb Impulse Response Synthesis" IEEE/CVF International Conference on Computer Vision (ICCV). 2021: pp. 286-295.

* cited by examiner

Fig.6

| ACOUSTIC PARAMETER SP / ROOM INFORMATION RI | AGC | NOISE REDUCTION |
|---|---|---|
| CLOSED SPACE | ON | OFF |
| OPEN SPACE | OFF | ON |

AUDIO SIGNAL PROCESSING METHOD AND AUDIO SIGNAL PROCESSING DEVICE

CROSS REFERENCE TO RELATED APPLICATIONS

This Nonprovisional application claims priority under 35 U.S.C. § 119 (a) on Patent Application No. 2022-043931 filed in Japan on Mar. 18, 2022, the entire contents of which are hereby incorporated by reference.

BACKGROUND

Technical Field

One embodiment in accordance with the invention relates to an audio signal processing method and an audio signal processing device that are related to audio signal processing.

Background Information

Unexamined Japanese Patent Publication No. 2011-151634 discloses a gain automatic setting device equipped with a microphone. The gain automatic setting device detects a level of user's voice, which is collected by a microphone, and a level of background noise. The gain automatic setting device sets a gain based on the level of user's voice and the level of background noise.

Unexamined Japanese Patent Publication No. 2010-122617 discloses a noise gate that suppresses a voice signal. The noise gate calculates a signal level of the voice signal that has been inputted. The noise gate reduces a gain of the voice signal whose signal level is less than a threshold.

SUMMARY

The gain automatic setting device disclosed in Unexamined Japanese Patent Publication No. 2011-151634 (hereafter, referred to as a device X) and the noise gate disclosed in Unexamined Japanese Patent Publication No. 2010-122617 (hereafter, referred to as a device Y) each perform automatic gain regulation based on an audio signal. Accordingly, the device X and the device Y do not necessarily perform suitable sound processing according to a usage situation. For instance, in a closed space such as a meeting room, all the people who are in the meeting room are likely to be attendees. Accordingly, it is preferred that the device X and the device Y amplify talker's voice through an AGC (Auto Gain Control) such that the talker's voice, even if being small, can be collected as much as possible. In addition to this, all the people who are in the meeting room are less likely to make a noise. Therefore, the device X and the device Y are less likely to collect the noise whose volume is increased through the AGC. On the other hand, if being in an open space, a plurality of persons each having a different purpose will share the space, for example. Thus, the persons, except for a user of the device X and the device Y, are more likely to make a noise. Therefore, it is preferred that the device X and the device Y suppress a noise. However, if the device X and the device Y execute the AGC in the open space like the closed space, a noise will be amplified contrarily.

One embodiment of the present invention aims to provide an audio signal processing method capable of performing suitable sound processing according to a situation.

The audio signal processing method in accordance with one embodiment of the present invention includes:

receiving an audio signal;
obtaining a first image;
estimating room information based on the obtained first image;
setting an acoustic parameter according to the estimated room information;
applying sound processing to the audio signal according to the set acoustic parameter; and
outputting the audio signal subjected to the sound processing.

The audio signal processing method in accordance with one embodiment of the invention makes it possible to perform suitable sound processing according to a situation.

BRIEF DESCRIPTION OF THE DRAWINGS

FIG. 6 is a view showing a correspondence relationship between room information RI and an acoustic parameter SP;

DETAILED DESCRIPTION

First Embodiment

Figure 1:
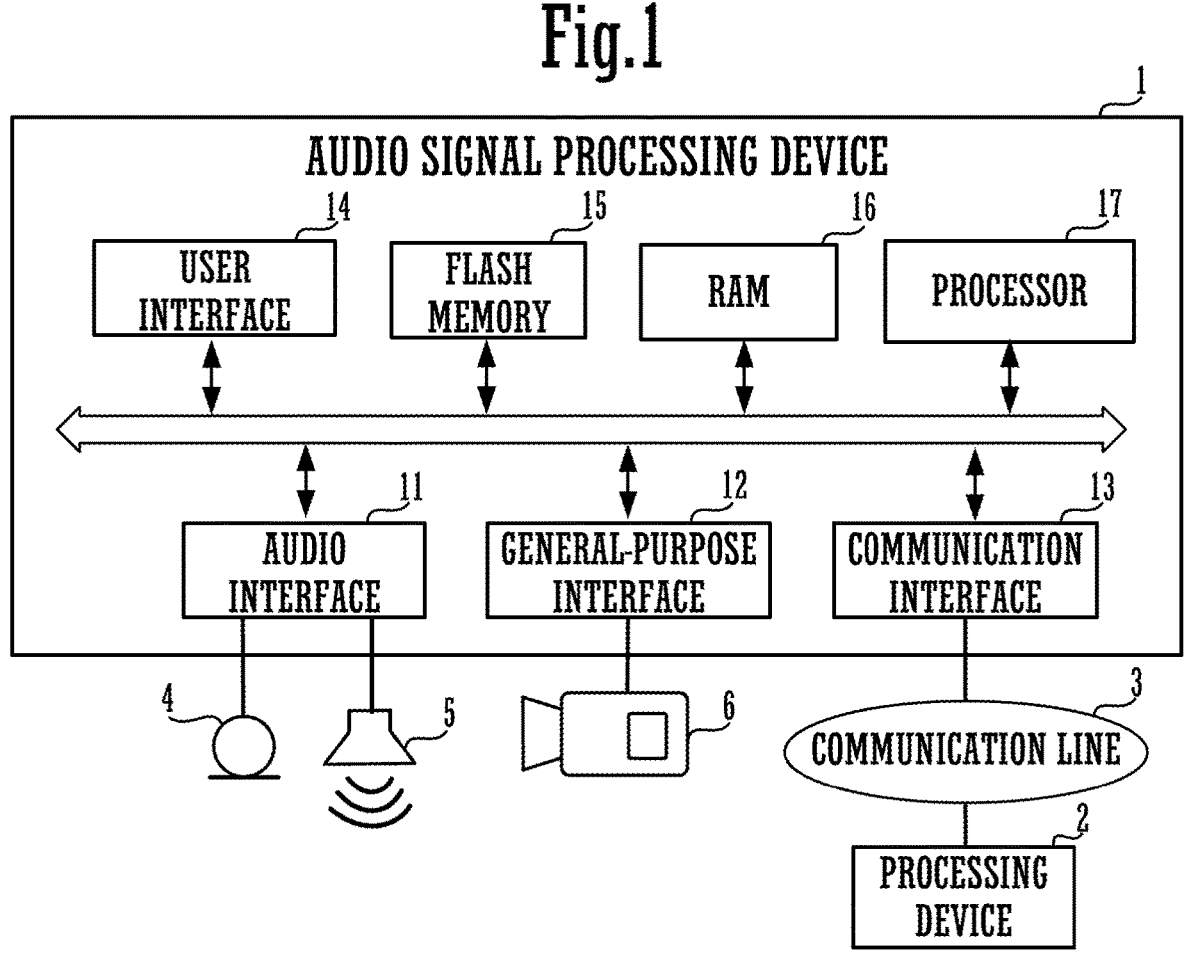
FIG. 1 is a block diagram showing an example of connection between an audio signal processing device 1 and an apparatus different from the audio signal processing device 1.

Hereinafter, an audio signal processing method in accordance with a first embodiment will be described with reference to the drawings. FIG. 1 is a block diagram showing an example of connection between an audio signal processing device 1 and an apparatus (processing device 2) different from the audio signal processing device 1.

The audio signal processing device 1 is a device for connecting with the processing device 2, such as a remote PC, to make remote conversation (see FIG. 1). The audio signal processing device 1 is an information processor such as a PC, for example. The audio signal processing device 1 executes an audio signal processing method in accordance with a first embodiment.

As shown in FIG. 1, the audio signal processing device 1 is provided with an audio interface 11, a general-purpose interface 12, a communication interface 13, a user interface 14, a flash memory 15, a RAM (Random Access Memory) 16, and a processor 17. The processor 17 is a CPU (Central Processing Unit) or the like, for example.

The audio interface 11 communicates with audio equipment such as a microphone 4 or a speaker 5 through a signal line (see FIG. 1). The microphone 4 obtains a voice of a user (hereafter, referred to as a user U) of the audio signal processing device 1. The microphone 4 outputs the obtained voice to the audio interface 11 as an audio signal. The audio interface 11 converts a digital audio signal, which is received from the processing device 2, into an analog audio signal, for example. The speaker 5 receives the analog audio signal from the audio interface 11, and outputs sound based on the received analog audio signal.

The general-purpose interface 12 is an interface based on standards such as a USB (Universal Serial Bus), for example. As shown in FIG. 1, the general-purpose interface 12 is connected to a camera 6. The camera 6 photographs the periphery of the camera 6 (periphery of a user U), thereby obtaining a first image M1. The camera 6 outputs the obtained first image M1 to the general-purpose interface 12 as image data.

The communication interface 13 is a network interface or the like. The communication interface 13 communicates with the processing device 2 through a communication line 3. The communication line 3 is the Internet or a LAN (Local Area Network). The communication interface 13 and the processing device 2 communicate with each other in a wireless or wired manner.

The user interface 14 receives an operation of the audio signal processing device 1 from the user U. The user interface 14 is a keyboard, a mouse, a touch panel, or the like, for example.

The flash memory 15 stores various kinds of programs. The various kinds of programs are a program for operating the audio signal processing device 1, an application program for executing sound processing in accordance with the audio signal processing method, and the like. Note that, it is not necessary for the flash memory 15 to store the various kinds of programs. For instance, the various kinds of programs may be stored in other devices such as a server. In this case, the audio signal processing device 1 receives the various kinds of programs from the other devices such as a server.

The processor 17 reads out the program, which is stored in the flash memory 15, to the RAM 16, thereby executing various kinds of operations. The processor 17 performs signal processing (hereafter, referred to as sound processing P) in accordance with the audio signal processing method, processing related to communication between the audio signal processing device 1 and the processing device 2, or the like.

The processor 17 receives an audio signal from the microphone 4 through the audio interface 11. The processor 17 applies the sound processing P to the received audio signal. The processor 17 transmits the audio signal, which is subjected to the sound processing P, to the processing device 2 through the communication interface 13. The processor 17 receives the audio signal from the processing device 2 through the communication interface 13. The processor 17 transmits the audio signal to the speaker 5 through the audio interface 11. Further, the processor 17 receives the first image M1 from the camera 6 through the general-purpose interface 12.

The processing device 2 is provided with a speaker (not shown). The speaker of the processing device 2 outputs sound based on the audio signal received from the audio signal processing device 1. A user (hereafter, referred to as an interlocutor) of the processing device 2 hears the sound outputted from the speaker of the processing device 2. The processing device 2 is provided with a microphone (not shown). The processing device 2 transmits an audio signal, which is obtained by the microphone of the processing device 2, to the audio signal processing device 1 through the communication interface 13.

Figure 2:
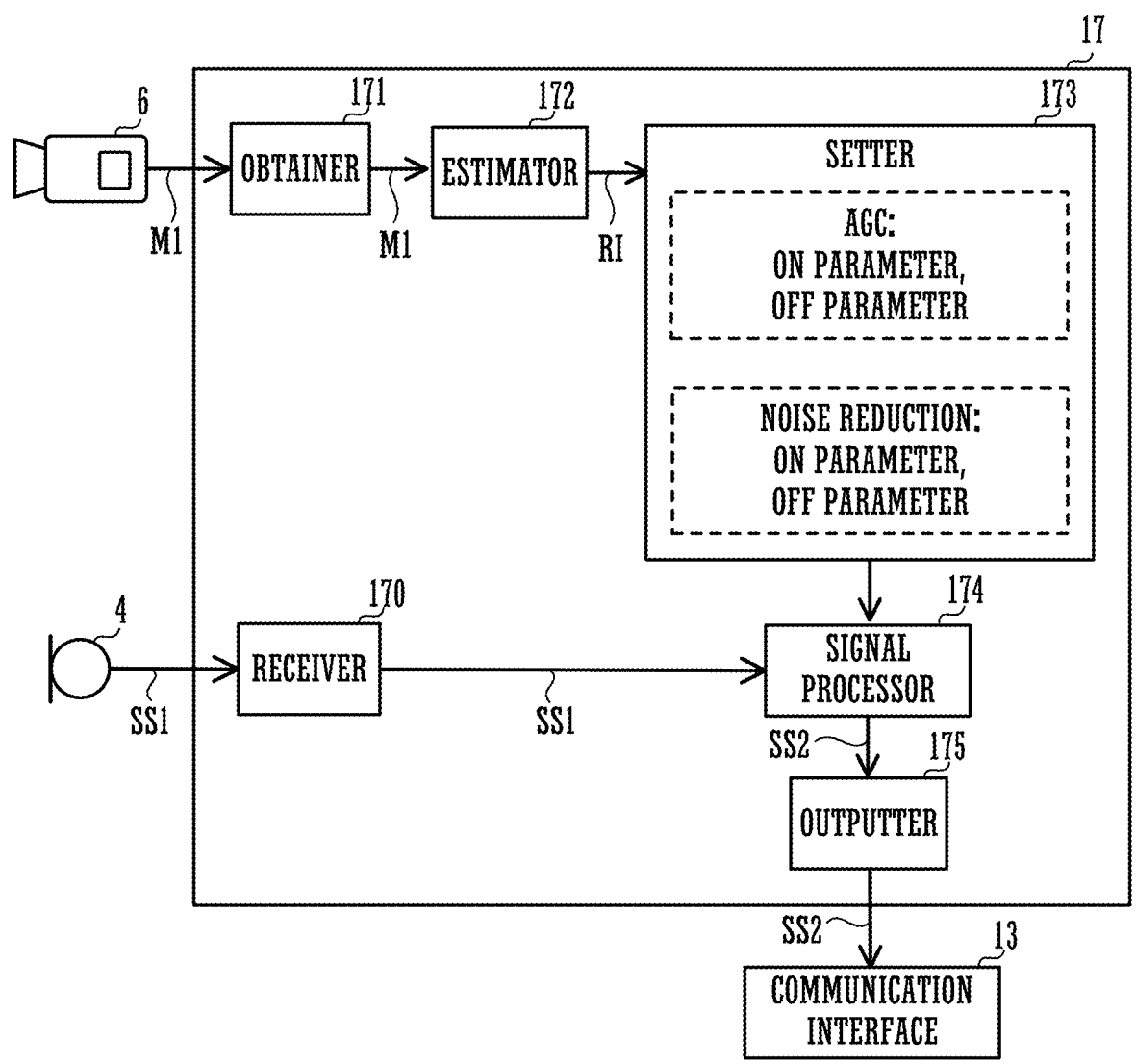
FIG. 2 is a block diagram showing a functional configuration of a processor 17.
Figure 3:
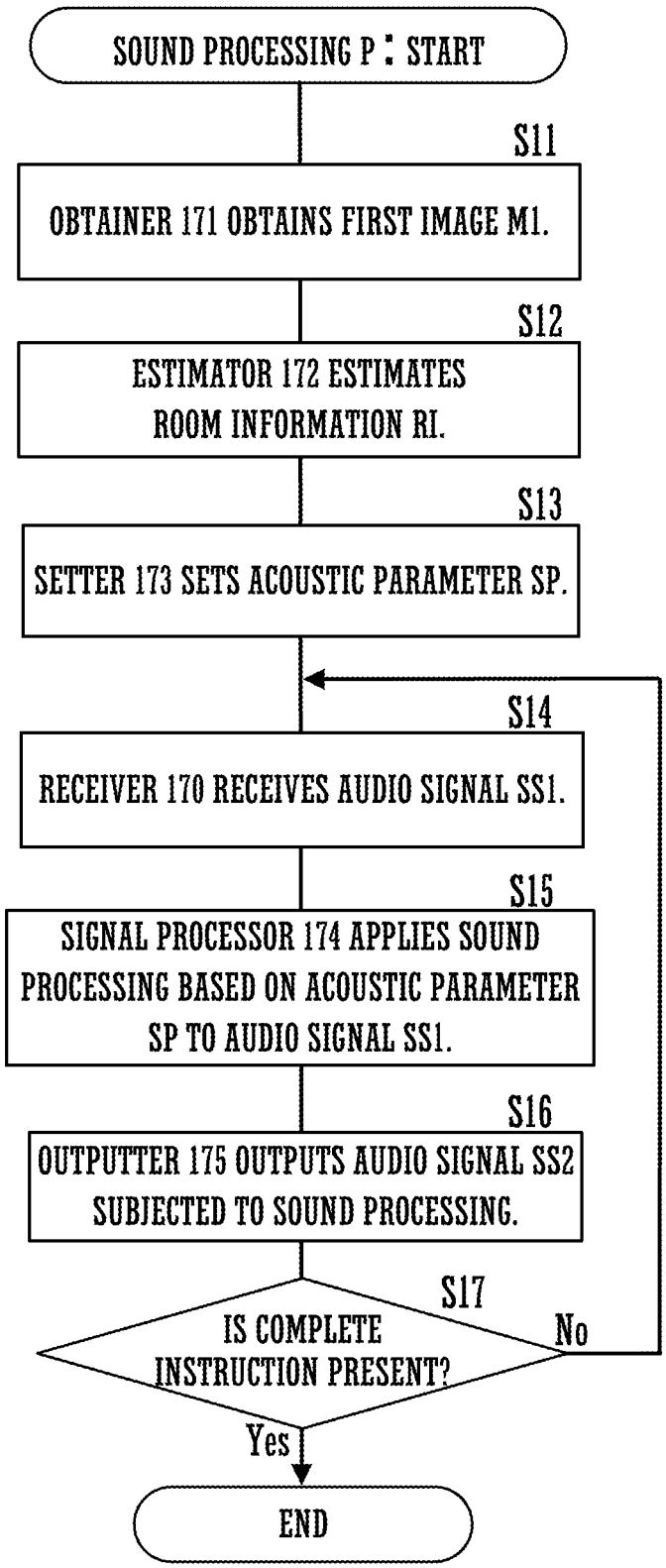
FIG. 3 is a flowchart showing an example of processing of the audio signal processing device 1.
Figure 4:
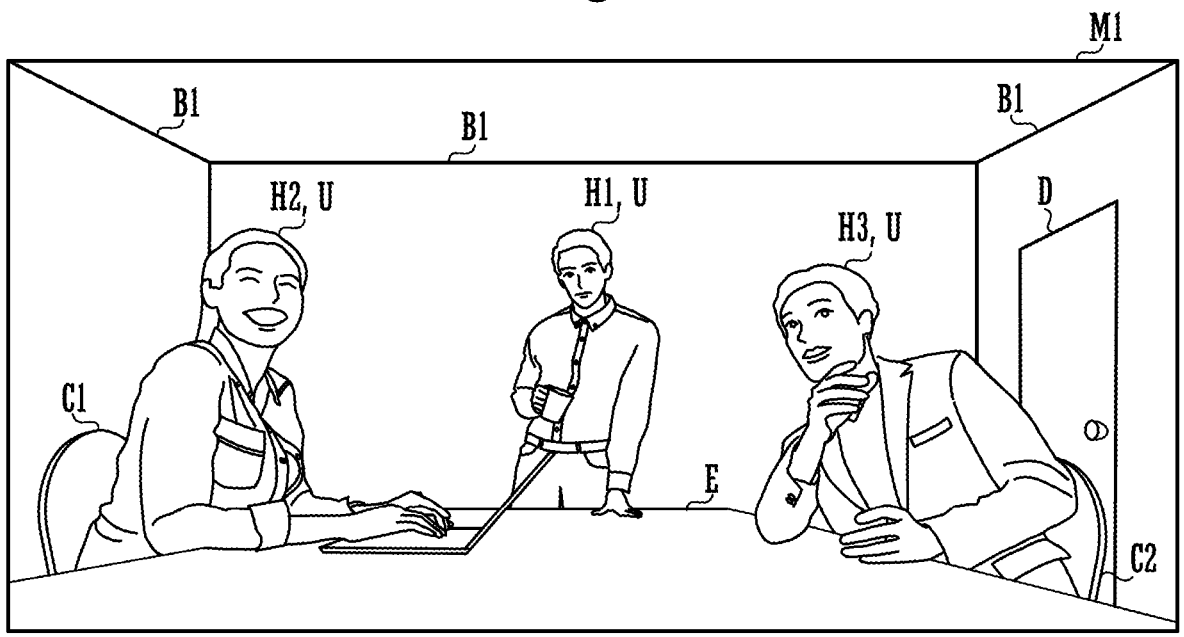
FIG. 4 is an example of a first image M1 indicating a closed space.
Figure 5:
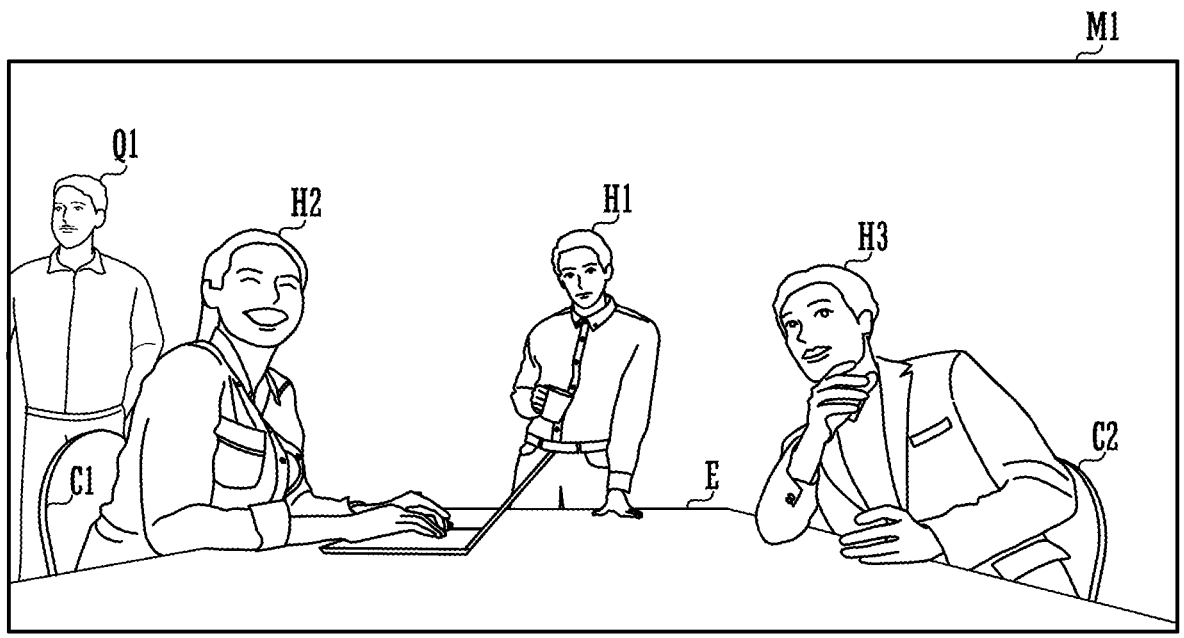
FIG. 5 is an example of the first image M1 indicating an open space.

Hereinafter, the sound processing P in the processor 17 will be described in detail with reference to the drawings. FIG. 2 is a block diagram showing a functional configuration of the processor 17. FIG. 3 is a flowchart showing an example of processing of the audio signal processing device 1. FIG. 4 is an example of a first image M1 indicating a closed space. FIG. 5 is an example of the first image M1 indicating an open space. FIG. 6 is a view showing a correspondence relationship between room information RI and an acoustic parameter SP.

As shown in FIG. 2, the processor 17 includes a receiver 170, an obtainer 171, an estimator 172, a setter 173, a signal processor 174, and an outputter 175, functionally. The receiver 170, the obtainer 171, the estimator 172, the setter 173, the signal processor 174, and the outputter 175 execute the sound processing P.

For instance, the processor 17 starts the sound processing P, when an application program related to the sound processing P is executed (FIG. 3: START).

After the processing is started, the obtainer 171 obtains an image (hereafter, referred to as a first image M1) (FIG. 3: Step S11). The obtainer 171 obtains the first image M1 from the camera 6, and outputs it to the estimator 172.

Next, the estimator 172 estimates room information RI based on the first image M1 (FIG. 3: Step S12). The room information RI is information indicating a space where the user U is present, for example. In the present embodiment, the information, which indicates a space where a user U is present, is information indicating whether the space is a closed space (unopened space) or an open space (opened space), for example. In other words, in the present embodiment, the room information RI includes the information indicating an open space or a closed space. The closed space is an indoor space, such as a meeting room, that is partitioned by a wall, a ceiling, or the like, for example. The open space is an opened space, such as a multi-purpose space or outdoors, that is not partitioned by a wall, a ceiling, or the like, for example.

The estimator 172 applies analysis processing to the first image M1, thereby estimating the room information RI. The analysis processing is analysis processing using artificial intelligence such as a neural network (e.g., a DNN (Deep Neural Network) or the like), for example. The estimator 172 estimates the room information RI using a learned model that has learned a relationship between an input image and the room information RI by machine learning. Specifically, the estimator 172 extracts a feature amount of the first image M1, and outputs it to the learned model. For instance, based on the feature amount included in the first image M1 or the like, the learned model determines an object included in the first image M1. The feature amount is an edge in the first image M1, a texture, or the like, for example. The learned model determines whether a space where a user U is present is the closed space or the open space, based on the object included in the first image M1.

In this case, when determining that a closed-space-specific object is included in the first image M1, the learned model determines that "the room information RI indicates the closed space." For instance, when the camera 6 photographs the closed space, a boundary B1 between a wall and a ceiling is captured in the first image M1 with a high possibility (see FIG. 4). Accordingly, when recognizing the boundary B1 as the object included in the first image M1, the learned model determines that the space where a user U is present is the closed space, for example. On the other hand, when determining that the closed-space-specific object is not included in the first image M1, the learned model determines that "the room information RI indicates the open space."

Note that, in the example shown in FIG. 4, when the camera 6 photographs the closed space, a door D is captured in the first image M1 with a high possibility. Accordingly, when recognizing the door D as the object included in the first image M1, the learned model may determine that "the room information RI indicates the closed space," for example.

Note that, a method of estimating the room information RI by the audio signal processing device 1 is not limited to the method of using artificial intelligence such as a neural network. The audio signal processing device 1 may use pattern matching to estimate the room information RI, for example. In this case, an image indicating the closed space or an image indicating the open space is stored in the audio signal processing device 1 in advance as template data. The estimator 172 calculates a degree of similarity between the first image M1 and the template data, and estimates the room information RI based on the degree of similarity.

After Step S12, the setter 173 sets an acoustic parameter SP according to the estimated room information RI (FIG. 3: Step S13). The acoustic parameter SP in the present embodiment is a parameter related to the AGC or noise reduction. In the present embodiment, the setter 173 sets an acoustic parameter SP suitable for the closed space, or sets an acoustic parameter SP suitable for the open space. For instance, when the estimator 172 determines that "the room information RI indicates the closed space," the setter 173 sets a parameter that turns on the AGC and a parameter that turns off the noise reduction as the acoustic parameter SP (see FIG. 6). In other words, when the estimator 172 estimates that "the room information RI indicates the closed space," the setter 173 turns on the AGC and turns off the noise reduction. On the other hand, when the estimator 172 estimates that "the room information RI indicates the open space," the setter 173 turns off the AGC and turns on the noise reduction (see FIG. 6). As mentioned above, in the present embodiment, the setter 173 sets the acoustic parameter SP based on the information indicating whether the space is the open space or the closed space.

The noise reduction in the present embodiment is multi-channel signal processing, i.e., outputs one output signal from output signals of a plurality of microphones, for example. In this case, the microphone 4 is constituted by a microphone array having a plurality of microphones.

Note that, the noise reduction is not limited to the example mentioned above. For instance, the noise reduction may be a noise gate, i.e., calculate a signal level of the microphone 4 and attenuate the signal level of the microphone 4 only when the signal level is less than or equal to a fixed level. Alternatively, the noise reduction may be performed such that an average power of the microphone 4 is calculated for every frequency during a predetermined period (long time) to remove a noise through filter processing such as Wiener filter.

Next, the receiver 170 receives an audio signal (FIG. 3: Step S14). As shown in FIG. 2, the receiver 170 obtains an audio signal SS1 from the microphone 4.

Next, the signal processor 174 applies sound processing, which is based on the acoustic parameter SP, to the audio signal SS1 (FIG. 3: Step S15). For instance, if the AGC is ON, the setter 173 will perform processing (gain adjustment) in which a gain of the audio signal SS1 is increased or decreased automatically such that a level of talker's voice is kept constant. In other words, in the present embodiment, the sound processing P includes the gain adjustment. On the other hand, if the AGC is OFF in the setter 173, the signal processor 174 will not apply the AGC to the audio signal SS1. Further, if the noise reduction is ON, the setter 173 will suppress a noise of the audio signal SS1. In other words, in the present embodiment, the sound processing P includes the noise reduction. On the other hand, if noise reduction is OFF in the setter 173, the signal processor 174 will not apply the noise reduction to the audio signal SS1. Hereinafter, the audio signal subjected to the sound processing is referred to as an audio signal SS2.

Next, the outputter 175 outputs the audio signal SS2 (FIG. 3: Step S16). Specifically, the outputter 175 outputs the audio signal SS2 to the communication interface 13. The communication interface 13 transmits the audio signal SS2 to the processing device 2 through the communication line 3. The speaker of the processing device 2 emits sound based on the audio signal SS2.

After Step S16, the processor 17 determines whether a complete instruction of the application program related to the sound processing P is present or absent, for example (FIG. 3: Step S17). When determining that "the complete instruction is absent" (FIG. 3: No at Step S17), the processor 17 performs processes from Step S14 to Step S16 again. Thus, the processor 17 can repeat sound processing based on the acoustic parameter SP that has been set initially.

When determining that "the complete instruction is present" in Step S17 (FIG. 3: Yes at Step S17), the processor 17 completes series execution of the sound processing P (FIG. 3: END). Note that, the processor 17 may determine whether or not to complete the execution of the sound processing P using another method other than the method of determining the presence or absence of the complete instruction of the application program related to the sound processing P.

Note that, FIG. 3 exemplarily shows the order of processes, but it is not necessary for the processor 17 to execute the processes according to the order shown in FIG. 3. If the processes of Step S13 and Step S14 have been executed before Step S15 is executed, the processor 17 may execute the processes in an optional order. For instance, the processor 17 may execute the processes (process of setting the acoustic parameter SP) from Step S11 to Step S13 and the process (process of receiving the audio signal SS1) of Step S14 in parallel.

Effect of First Embodiment

The audio signal processing device 1 can perform suitable sound processing according to a situation. Specifically, the audio signal processing device 1 automatically estimates a kind (a closed space such as a meeting room or an open space) of space where the user U is present. Then, the audio signal processing device 1 sets the acoustic parameter SP based on the estimated result, automatically. For instance, when determining that "the room information RI indicates the closed space," the audio signal processing device 1 turns on the AGC automatically, and turns off the noise reduction automatically. By turning on the AGC, the audio signal processing device 1 causes a voice of a talker located away from the microphone 4 and a voice of a talker located near the microphone 4 to have a fixed level. Further, by turning off the noise reduction, the audio signal processing device 1 does not eliminate a voice of the user U located away from the microphone 4 as a noise. Accordingly, the audio signal processing device 1 sets the acoustic parameter SP so as to be suitable for the closed space in which a talker is likely to be located away from the microphone 4, automatically.

By turning on the noise reduction, the audio signal processing device 1 eliminates sound (e.g., a stationary noise or a voice of a person located away from the microphone 4) away from the microphone 4. Further, by turning off the AGC, the audio signal processing device 1 does not increase a volume of noise away from the microphone 4. As a result, the audio signal processing device 1 sets the acoustic parameter SP so as to be suitable for the open space in which a talker is located only near the microphone 4, automatically. As mentioned above, the audio signal processing device 1 can perform sound processing according to a situation (according to a space where the user U is present), appropriately.

The audio signal processing device 1 sets the acoustic parameter SP automatically based on a kind of space where the user U is present. Therefore, it is not necessary for the user U to set the acoustic parameter SP manually. As a result, this makes it possible to reduce a setting mistake of the acoustic parameter SP through the user U or the like. Consequently, the user U and an interlocutor can talk with each other based on sound to which suitable sound processing is applied.

FIRST MODIFICATION

Hereinafter, an audio signal processing device 1a (not shown) in accordance with a first modification will be described. A configuration of the audio signal processing device 1a is the same as that of the audio signal processing device 1 shown in FIG. 2. The audio signal processing device 1a applies sound processing P to an audio signal received from the processing device 2 instead of applying sound processing P to the audio signal received from the microphone 4. For instance, when estimating that "the room information RI indicates the closed space," the audio signal processing device 1a sets the acoustic parameter SP so as to decrease a gain of the audio signal, which is received from the processing device 2, according to a low-noise environment. Thus, the audio signal processing device 1a outputs a voice of a remote interlocutor at an appropriate volume, which is suitable for a listening environment. On the other hand, when estimating that "the room information RI indicates the open space," the audio signal processing device 1a sets the acoustic parameter SP so as to increase a gain of the audio signal, which is received from the processing device 2, according to a noisy environment, for example. In this case, the audio signal processing device 1a also outputs a voice of a remote interlocutor at an appropriate volume, which is suitable for a listening environment. The audio signal processing device 1a can apply suitable sound processing to the audio signal, which is to be outputted to the speaker 5, according to a situation.

Note that, the audio signal processing device 1a may apply the sound processing P to both the audio signal SS1 received from the microphone 4 and the audio signal received from the processing device 2.

Second Modification

Figure 7:
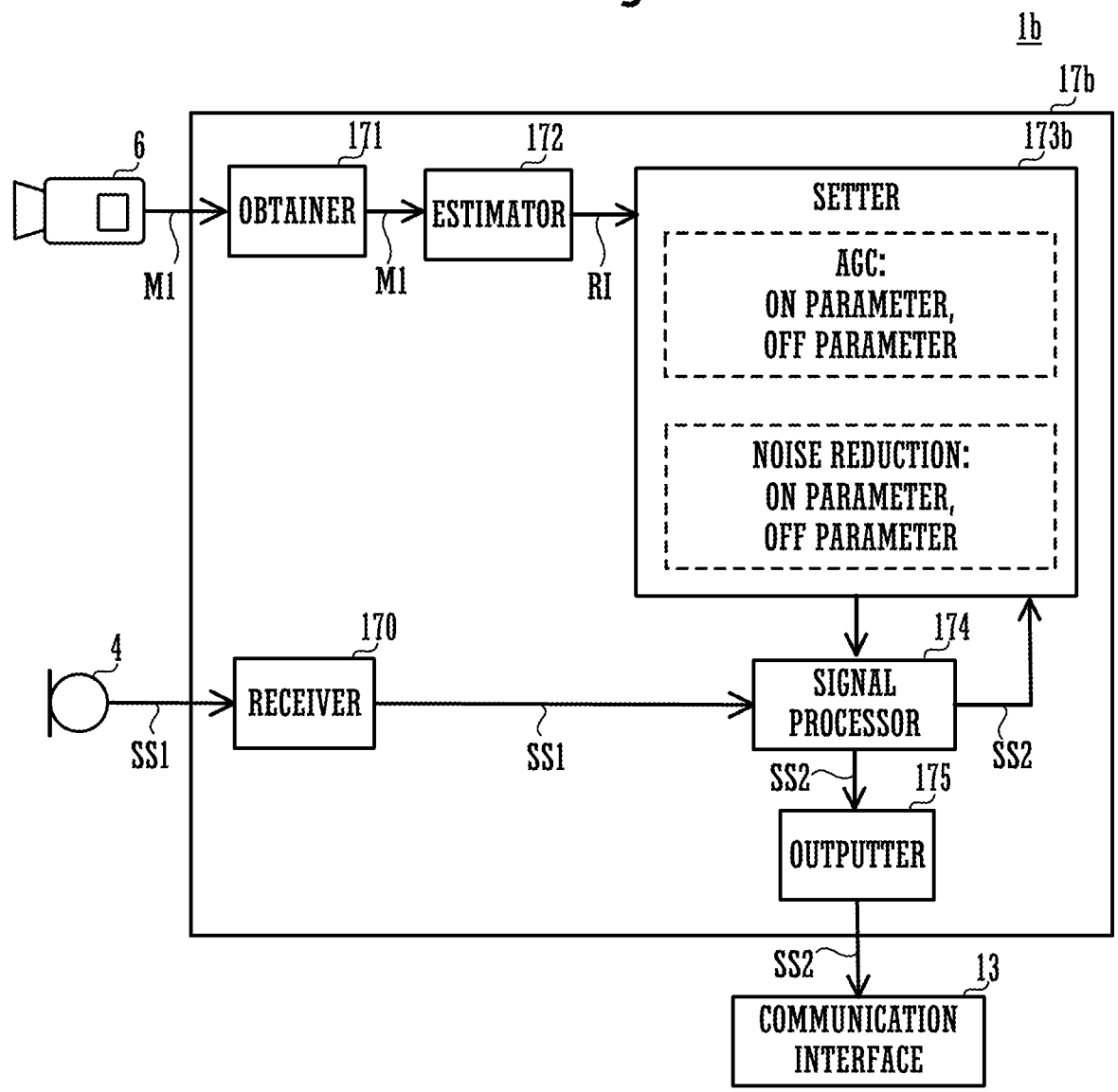
FIG. 7 is a block diagram showing a functional configuration of a processor 17b of an audio signal processing device 1b.

Hereinafter, an audio signal processing device 1b in accordance with a second modification will be described with reference to the drawing. FIG. 7 is a block diagram showing a functional configuration of a processor 17b of the audio signal processing device 1b.

The processor 17b included in the audio signal processing device 1b functionally includes a setter 173b instead of the setter 173 (see FIG. 7). In addition to the processing of the setter 173, the setter 173b performs processing so as to set an acoustic parameter SP based on the audio signal SS2 subjected to the sound processing P. For instance, the setter 173b measures a signal level of noise (stationary noise) included in the audio signal SS2 subjected to the sound processing. When detecting that the signal level of noise is more than or equal to a predetermined threshold, the setter 173b turns off the AGC, and turns on the noise reduction. In this way, even if the estimator 172 estimates that the space is the closed space instead of the open space by mistake, the setter 173b performs acoustic control (turns on the AGC and turns off the noise reduction) suitable for the open space. The audio signal processing device 1b enables an interlocutor to have a conversation with the user U in the state where sound quality is improved.

Third Modification

Figure 8:
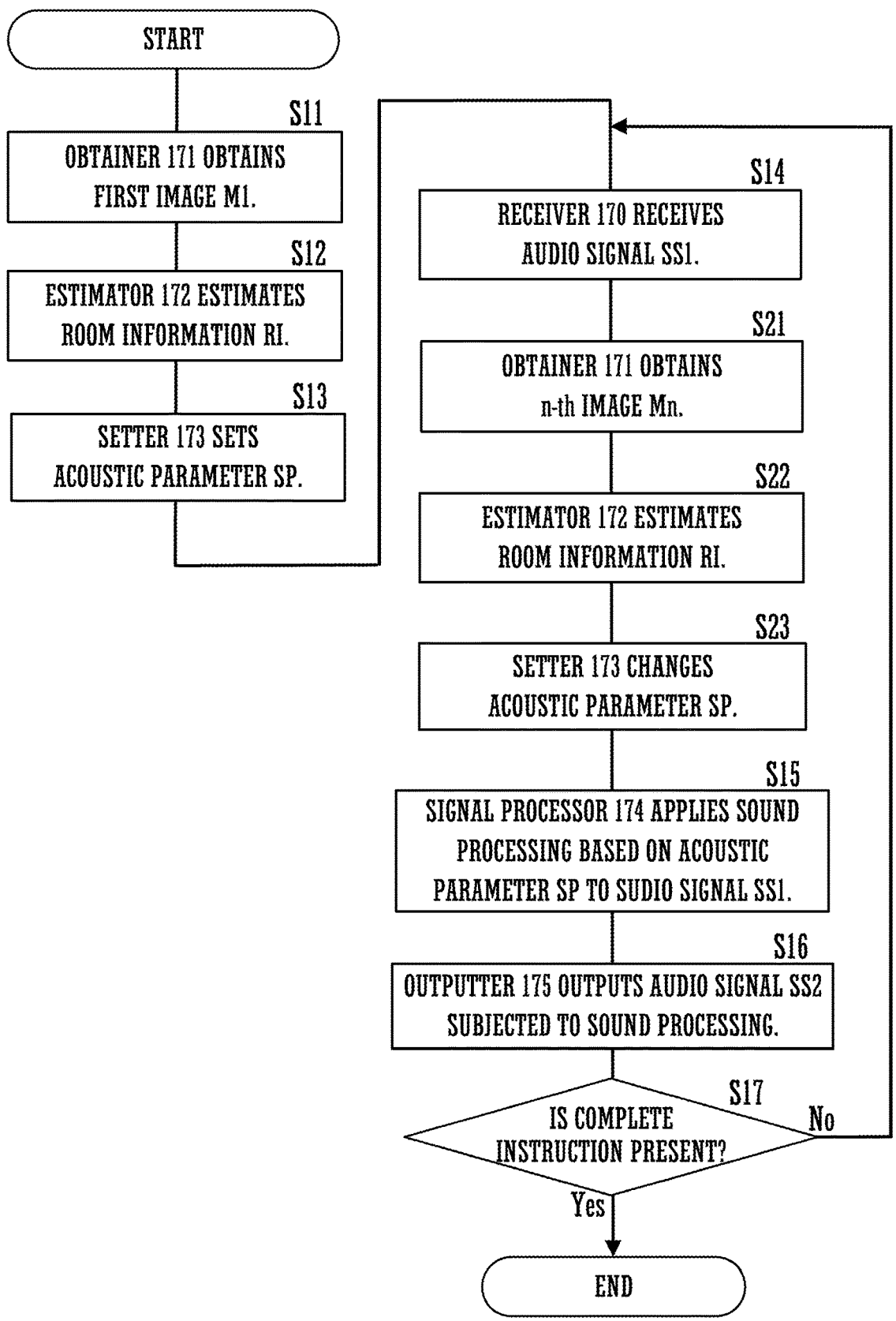
FIG. 8 is a flowchart showing an example of setting of the acoustic parameter SP in an audio signal processing device 1c.

Hereinafter, an audio signal processing device 1c in accordance with a third modification will be described with reference to the drawing. FIG. 8 is a flowchart showing an example of setting of the acoustic parameter SP in the audio signal processing device 1c. A configuration of the audio signal processing device 1c is the same as that of the audio signal processing device 1 shown in FIG. 2.

In the audio signal processing device 1, an image obtaining process, a room information RI estimating process, and an acoustic parameter SP setting process each are performed once, whereas in the audio signal processing device 1c, the image obtaining process, the room information RI estimating process, and the acoustic parameter SP setting process each are performed twice or more. Hereinafter, the processing will be described in detail.

After Step S14, the audio signal processing device 1c obtains the n-th image (referred to as an n-th image Mn) from the camera 6 (FIG. 8: Step S21). Note that, n is an optional number more than or equal to one, and to obtain the n-th image Mn means that the process after S14 is the n-th time. In other words, the obtainer 171 obtains a second image M2 at a timing different from the timing when the first image M1 is obtained.

After the obtainer 171 obtains the second image M2, the estimator 172 of the audio signal processing device 1c estimates room information RI from the obtained second image M2 (FIG. 8: Step S22). A method of estimating the room information RI in the audio signal processing device 1c is the same as the method of estimating the room information RI in the audio signal processing device 1.

After the estimator 172 estimates the room information RI based on the second image M2, the setter 173 of the audio signal processing device 1c changes the acoustic parameter SP based on the room information RI, which has been estimated based on the second image M2 (FIG. 8: Step S23). In this case, the signal processor 174 of the audio signal processing device 1c applies sound processing, which is based on the changed acoustic parameter SP, to the audio signal SS1 (FIG. 8: Step S15). Additionally, the outputter 175 of the audio signal processing device 1c outputs an audio signal SS2, which is subjected to the sound processing based on the changed acoustic parameter SP, to the processing device 2 (FIG. 8: Step S16).

After Step S16, the processor 17 of the audio signal processing device 1c executes Step S17. When determining that "the complete instruction is absent" in Step S17 (FIG. 8: No at Step S17), the processor 17 executes the processes of Steps S14, S21, S22, S23, S15, and S16 again.

When determining that "the complete instruction is present" in Step S17 (FIG. 8: Yes at Step S17), processor 17 completes series execution of the sound processing P (FIG. 8: END).

Effect of Third Modification

In the audio signal processing device 1, setting of the acoustic parameter SP is executed once after the application program related to the sound processing P is started, whereas in the audio signal processing device 1c, the setting of the acoustic parameter SP is executed twice or more. Therefore, in response to a change of the space where the user U is present, the audio signal processing device 1c can change the acoustic parameter SP. For instance, a partition or the like in a room may be removed by the user U. In this case, the space where the user U is present is changed from the closed space to the open space. At this time, the audio signal processing device 1c changes the acoustic parameter SP automatically. Accordingly, the audio signal processing device 1c can perform sound processing using the acoustic parameter SP that is set appropriately according to a change of a situation.

Fourth Modification

Figure 9:
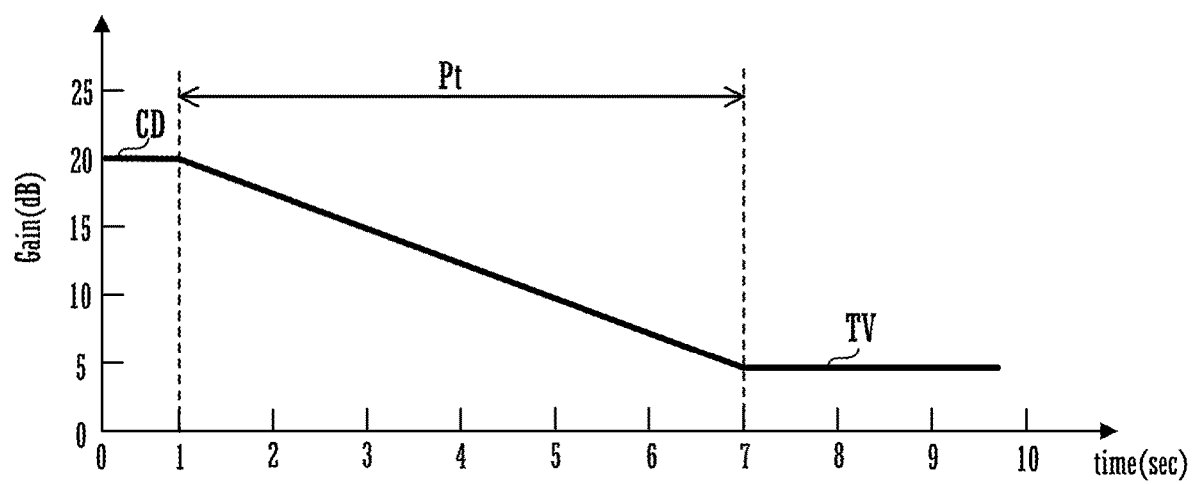
FIG. 9 is a view showing a gain adjustment in an audio signal processing device 1d.

Hereinafter, an audio signal processing device 1d in accordance with a fourth modification will be described with reference to the drawing. FIG. 9 is a view showing a gain adjustment in the audio signal processing device 1d. A configuration of the audio signal processing device 1d is the same as that of the audio signal processing device 1 shown in FIG. 2.

The signal processor 174 of the audio signal processing device 1d changes the acoustic parameter SP gradually during a predetermined period Pt, as for a change in the acoustic parameter SP. In the present modification, the audio signal processing device 1d changes the AGC from OFF to ON gradually during the predetermined period Pt. Specifically, when turning on the AGC, the audio signal processing device 1d determines a target value TV of a gain of the audio signal SS1. The audio signal processing device 1d sets the target value TV as the acoustic parameter SP. At this time, the target value TV may differ from a current value CD of the audio signal SS1. In this case, a value of a gain of the audio signal SS1 is gradually changed from the current value CD to the target value TV over the predetermined period Pt. In the present modification, a flash memory 15 of the audio signal processing device 1d stores the predetermined period Pt in advance.

In the example shown in FIG. 9, the flash memory 15 memorizes that the predetermined period Pt is 6 seconds. In this case, the audio signal processing device 1d changes the value of a gain of the audio signal SS1 gradually for 6 seconds. For instance, in FIG. 9, the current value of a gain of the audio signal SS1 is 20 dB, and the target value TV of a gain of the audio signal SS1 is 5 dB. In this case, the audio signal processing device 1d changes the value of a gain of audio signal SS1 from 20 dB to 5 dB for 6 seconds. This makes it possible for an interlocutor to have a conversation with the user U without feeling discomfort with the sound outputted from the speaker of the processing device 2.

Fifth Modification

Figure 10:
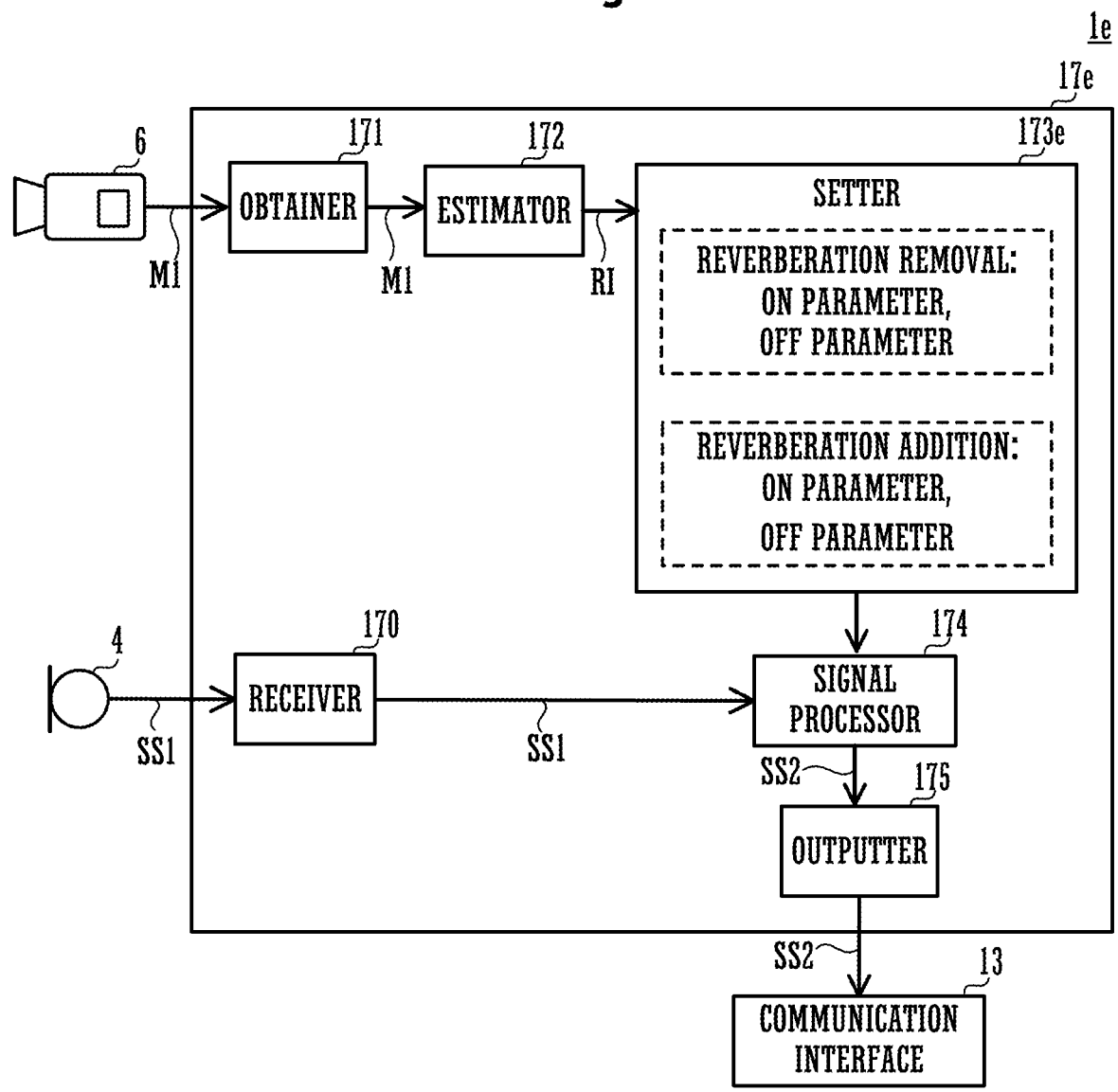
FIG. 10 is a block diagram showing a functional configuration of a processor 17e of an audio signal processing device 1e.

Hereinafter, an audio signal processing device 1e in accordance with a fifth modification will be described with reference to the drawing. FIG. 10 is a block diagram showing a functional configuration of a processor 17e of the audio signal processing device 1.

The processor 17e included in the audio signal processing device 1e executes reverberation removal or reverberation addition, which are sound processing different from the AGC or the noise reduction. Accordingly, the acoustic parameter SP in the present modification is a parameter related to the reverberation removal or the reverberation addition. The processor 17e includes a setter 173e functionally instead of the setter 173 (see FIG. 10). The setter 173e turns on and off the reverberation removal, or turns on and off the reverberation addition. In other words, in the present modification, the sound processing P includes at least one of the reverberation removal or the reverberation addition.

In more detail, when the estimator 172 estimates that "the room information RI indicates the closed space," the setter 173e turns on the reverberation removal. In this case, the audio signal processing device 1e applies reverberation removal to the audio signal SS1, which is related to the sound obtained by the microphone 4. The audio signal processing device 1e transmits the audio signal SS2, which is subjected to the reverberation removal, to the processing device 2. The interlocutor can use the sound subjected to the reverberation removal by the audio signal processing device 1e to make a conversation with the user U. Accordingly, the interlocutor can hear only a direct sound from the user U, thereby making it easy to hear a voice of the user U.

On the other hand, when the estimator 172 estimates that "the room information RI indicates the open space," the setter 173e turns on the reverberation addition. In this case, the audio signal processing device 1e applies the reverberation addition to the audio signal received from the processing device 2. The speaker 5 emits sound based on the audio signal SS2 subjected to the reverberation addition. By applying the reverberation addition to the audio signal, the user U can make a realistic conversation (e.g., such a state that the user U is in conversation with an interlocutor in a meeting room) with an interlocutor. As mentioned above, the audio signal processing device 1e can execute reverberation addition or reverberation removal appropriately according to a situation.

Sixth Modification

Figure 11:
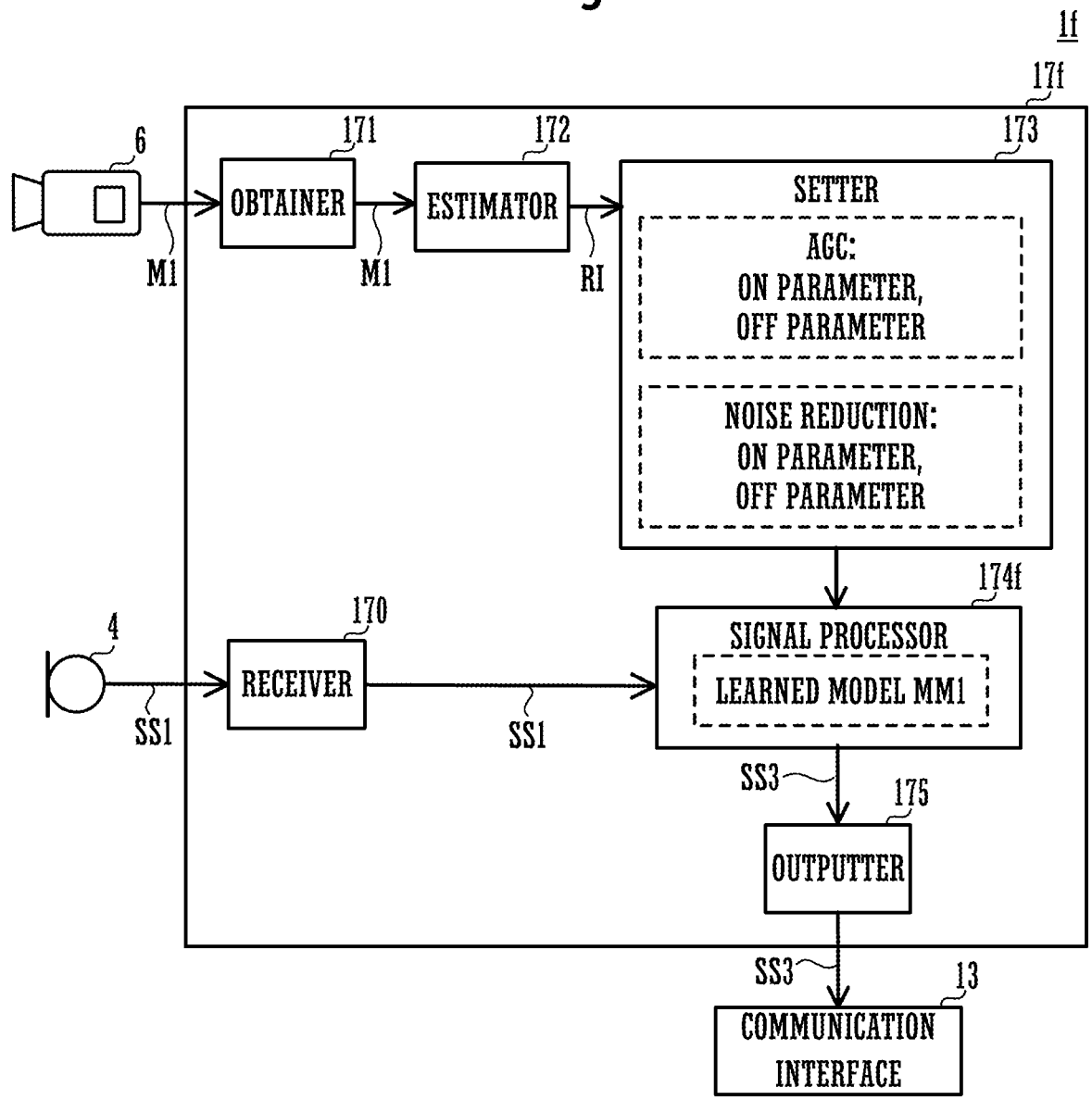
FIG. 11 is a block diagram showing a functional configuration of a processor 17f of an audio signal processing device 1f.

Hereinafter, an audio signal processing device 1f in accordance with a sixth modification will be described with reference to the drawing. FIG. 11 is a block diagram showing a functional configuration of a processor 17f of an audio signal processing device 1f. Note that, in the audio signal processing device 1f, like reference sign indicates like configuration in the audio signal processing device 1, and the description thereof is omitted.

The processor 17f included in the audio signal processing device 1f includes a signal processor 174f functionally, instead of the signal processor 174 (see FIG. 11). The signal processor 174f eliminates a noise of the audio signal SS1 using a learned model MM1 for noise elimination. The learned model MM1 has already learned processing in which an input audio signal (hereafter, referred to as a first audio signal) is converted into an audio signal (thereafter, referred to as a second audio signal) whose noise is eliminated. In other words, the learned model MM1 learns, by machine learning, a relationship between the first audio signal and the second audio signal obtained by removing a noise from the first audio signal. The signal processor 174f performs sound processing using the learned model MM1. Specifically, the signal processor 174f performs sound processing so as to convert the audio signal SS1 into an audio signal SS3 that is obtained by removing a noise from the audio signal SS1. The signal processor 174f transmits the audio signal SS3 to the processing device 2 through the outputter 175.

Note that, t is not necessary for the audio signal processing device 1f to include the learned model MM1. Other devices, such as a server, may include the learned model MM1. In this case, the audio signal processing device 1f transmits the audio signal SS1 to the other devices including the learned model MM1, and thereby removes a noise from the audio signal SS1.

Seventh Modification

Hereinafter, an audio signal processing devices 1g (not shown) in accordance with a seventh modification will be described with corresponding application to FIG. 4 and FIG. 5. A configuration of an audio signal processing device 1g is the same as that of the audio signal processing device 1 shown in FIG. 2. The audio signal processing device 1g sets the acoustic parameter SP based on room information RII other than the information indicating whether the space is the open space or the closed space.

Specifically, information RII includes the room information indicating a room itself or a usage state of a room. The information indicating a room itself includes a size of the room, a shape of the room, a material quality of the room, or the like, for example. The information indicating a usage state of a room includes the number of people in the room, fixtures (furniture or the like) in the room, or the like, for example. The fixtures in the room include the number of chairs in the room, a shape of a desk, or the like, for example. In other words, in the present modification, the room information RII includes at least one of a size of a room, a shape of a room, a material quality, the number of people, the number of chairs, or a shape of a desk.

For instance, the audio signal processing device 1g estimates a size of a room, a shape of a room, or a material quality of a room based on the first image M1 shown in FIG. 4. For instance, by using existing object recognition technology or the like, the audio signal processing device 1g estimates a size of a room, a shape of a room, or a material quality of a room. The audio signal processing device 1g sets the acoustic parameter SP to be suitable for the size of a room, the shape of a room, or the material quality of a room.

For instance, the audio signal processing device 1g sets the acoustic parameter SP so as to increase or decrease a value of a gain of the audio signal received from the processing device 2. Specifically, when estimating that a size of a room is large, the audio signal processing device 1g increases a gain of the audio signal received from the processing device 2. Thus, a volume of the sound, which is outputted from the speaker 5, is increased. Accordingly, even if being located away from the speaker 5, the user U can hear the sound outputted from the speaker 5. On the other hand, when estimating that a size of a room is small, the audio signal processing device 1g decreases a value of a gain of the audio signal received from the processing device 2. Thus, the user U is avoided from feeling a sense of discomfort due to a loud sound.

A size of a room, a shape of a room, or a material quality of a room is also a factor that affects reverberation of sound or the like. Accordingly, the audio signal processing device 1g turns on and off reverberation addition, for example. Specifically, based on a size of a room, a shape of a room, or a material quality of a room, the audio signal processing device 1g estimates whether the room is likely to cause reverberation or not. When estimating that the room is unlikely to cause reverberation, the audio signal processing device 1g turns on the reverberation addition. In this case, the audio signal processing device 1g applies reverberation adding processing to the audio signal received from the processing device 2. Thus, the speaker 5 outputs sound related to the reverberation-added audio signal. Accordingly, a sound quality of the sound emitted from the speaker 5 is improved. On the other hand, when estimating that the room is likely to cause reverberation, the audio signal processing device 1g turns off the reverberation addition. In this case, the audio signal processing device 1g does not apply reverberation adding processing to the audio signal received from the processing device 2. Consequently, the audio signal processing device 1g does not execute unnecessary processing. As mentioned above, the audio signal processing device 1g can switch ON and OFF of the reverberation addition appropriately according to the room.

Further, the audio signal processing device 1g turns on and off reverberation removal based on the estimation result as to whether the room is likely to cause reverberation or not. Specifically, when estimating that the room is likely to cause reverberation, the audio signal processing device 1g turns on the reverberation removal. In this case, the audio signal processing device 1g applies reverberation removing processing to the audio signal SS1 received from the microphone 4, thereby obtaining the audio signal SS2. The audio signal processing device 1g transmits the audio signal SS2 in which reverberation is removed to the processing device 2. Thus, the speaker of the processing device 2 outputs sound related to the reverberation-removed audio signal SS2. Accordingly, an interlocutor can easily hear a voice of the user U. On the other hand, when estimating that the room is unlikely to cause reverberation, the audio signal processing device 1g turns off the reverberation removal. In this case, the audio signal processing device 1g does not apply reverberation removing processing to the audio signal SS1 received from the microphone 4. Consequently, the audio signal processing device 1g does not execute unnecessary processing. As mentioned above, the audio signal processing device 1g can switch ON and OFF of the reverberation removal appropriately according to the room.

Further, by using existing object recognition technology or the like, the audio signal processing device 1g estimates the number of people, the number of chairs, or a shape of a desk. For instance, based on the first image M1 in FIG. 4, the audio signal processing device 1g determines that "the number of people is three (H1, H2, and H3), the number of chairs is two (C1 and C2), a shape of a desk (a shape of a desk E) is rectangular, and the like."

If a lot of people are present in the room or many chairs are arranged in the room, the reverberation in the room will be weakened easily. Further, if a shape of a desk, which is arranged in the room, is complicated, the reverberation in the room will be weakened easily. Accordingly, based on the number of people present in the room, the number of chairs arranged in the room, or a shape of a desk, the audio signal processing device 1g estimates whether the room is likely to cause reverberation or not. Based on the estimation result as to whether the room is likely to cause reverberation or not, the audio signal processing device 1g switches ON and OFF of the reverberation addition, or ON and OFF of the reverberation removal.

For instance, when estimating that the room is likely to cause reverberation (when estimating that few people or a few chairs are present or a shape of a desk is simple), the audio signal processing device 1g turns off the reverberation addition. In this case, the audio signal processing device 1g does not apply reverberation adding processing to the audio signal received from the processing device 2. Consequently, the audio signal processing device 1g does not execute unnecessary processing. Further, when estimating that the room is likely to cause reverberation, the audio signal processing device 1g turns on the reverberation removal. In this case, the audio signal processing device 1g applies reverberation removing processing to the audio signal SS1 received from the microphone 4, thereby obtaining the audio signal SS2. The audio signal processing device 1g transmits the audio signal SS2 in which reverberation is removed to the processing device 2. Accordingly, an interlocutor can easily hear a voice of the user U.

On the other hand, when estimating that the room is unlikely to cause reverberation (when estimating that a lot of people or many chairs are present or a shape of a desk is complicated), the audio signal processing device 1g turns on the reverberation addition. In this case, the audio signal processing device 1g applies reverberation adding processing to the audio signal received from the processing device 2. Accordingly, a quality of the sound emitted from the speaker 5 is improved. Further, when estimating that the room is unlikely to cause reverberation, the audio signal processing device 1g turns off the reverberation removal. In this case, the audio signal processing device 1g does not apply reverberation removing processing to the audio signal SS1 received from the microphone 4. Consequently, the audio signal processing device 1g does not execute unnecessary processing.

As mentioned above, in the present modification, the setter 173 of an audio signal processing device 1g sets the acoustic parameter SP according to a size of a room, a shape of a room, a material quality, the number of people, the number of chairs, or a shape of a desk. Accordingly, the audio signal processing device 1g executes the sound processing based on the acoustic parameter SP that is appropriately set according to a situation.

Note that, the room information RI1 may include information other than a size of a room, a shape of a room, a material quality, the number of people, the number of chairs, or a shape of a desk. The room information RI1 may include the number of people facing the camera 6 or the number of people not facing the camera 6 among people present in the room. The audio signal processing device 1g determines the number of people facing the camera 6 or the number of people not facing the camera 6 based on artificial intelligence or the like, for example. In the example shown in FIG. 5, the audio signal processing device 1g determines that "the number of people facing the camera 6 is three (H1, H2, and H3)" and "the number of people not facing the camera 6 is one (Q1)." When determining that the number of people facing the camera 6 is larger than the number of people not facing the camera 6, the audio signal processing device 1g determines that the space where the user U is present is the closed space. On the other hand, when determining that the number of people facing the camera 6 is smaller than the number of people not facing the camera 6, the audio signal processing device 1g determines that the space where the user U is present is the open space.

Note that, the room information RI1 may include a price of furniture arranged in the room or the like, for example. The audio signal processing device 1g sets the acoustic parameter SP based on the price of furniture, for example. In this case, using artificial intelligence or the like, the audio signal processing device 1g estimates a price of furniture captured in the first image M1, for example. When estimating that the price of the furniture is expensive, the audio signal processing device 1g sets the acoustic parameter SP so as to cause the speaker 5 not to generate sound with a fixed volume or more. As mentioned above, the audio signal processing device 1g estimates whether the space permits generation of loud sound or not based on a price of furniture, for example. In other words, the acoustic parameter SP suitable for the room can be set.

Eighth Modification

Figure 12:
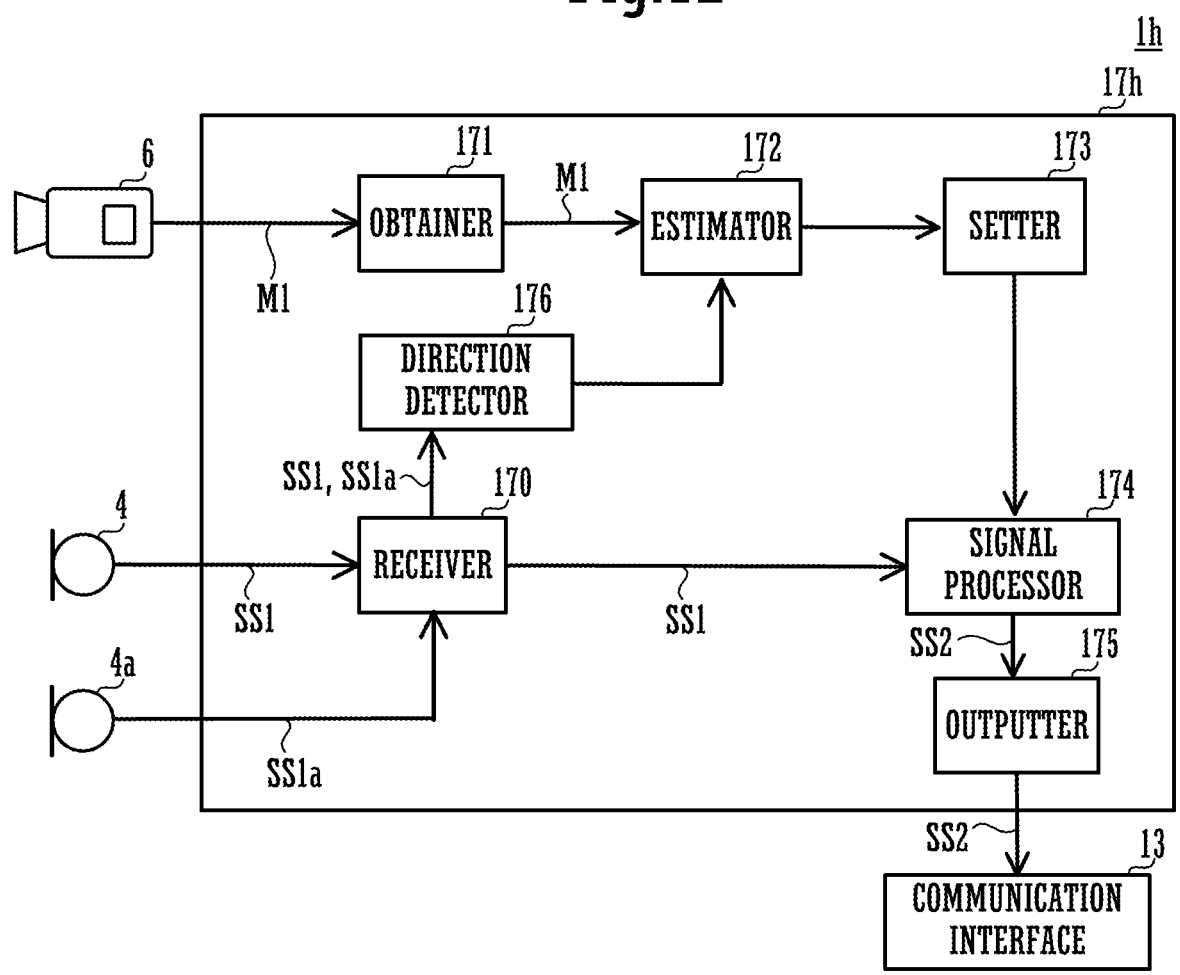
FIG. 12 is a block diagram showing a functional configuration of a processor 17h of an audio signal processing device 1h.
Figure 13:
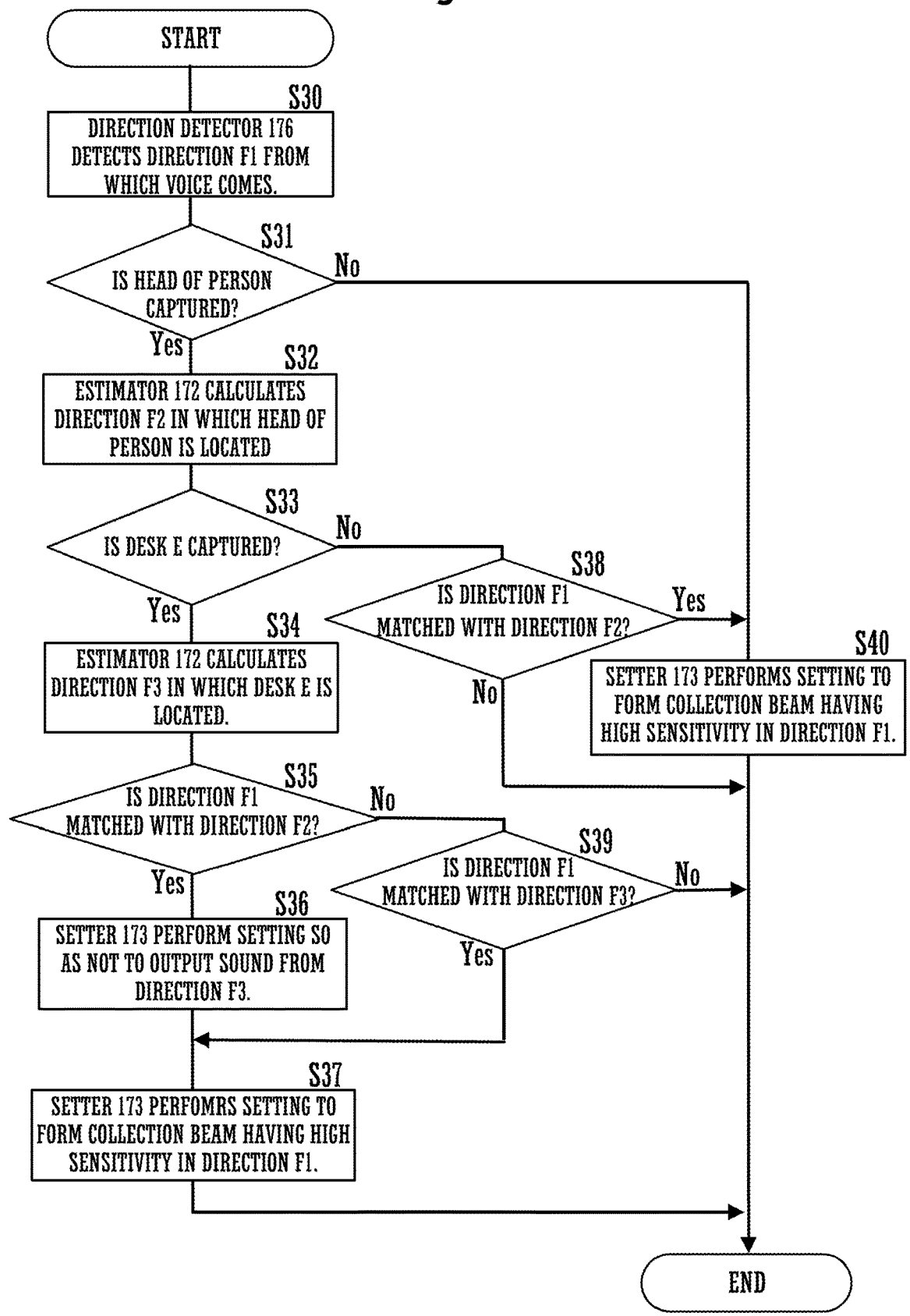
FIG. 13 is a flowchart showing an example of setting of the acoustic parameter SP in the audio signal processing device 1h.
Figure 14:
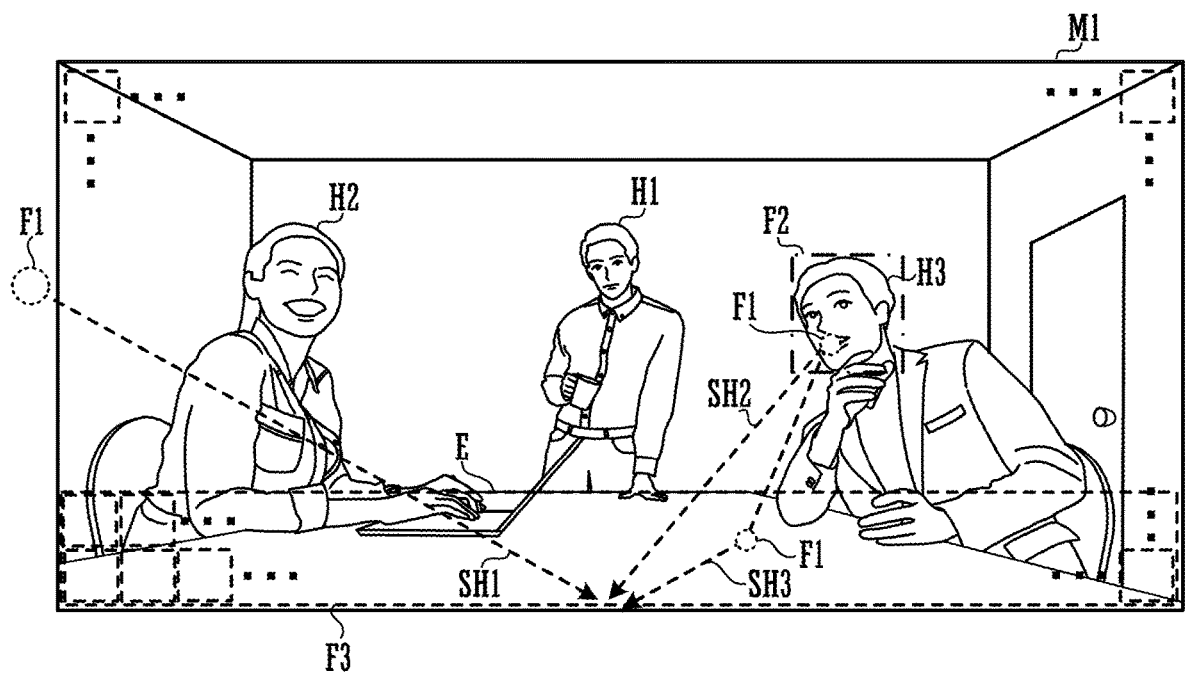
FIG. 14 is a view showing an example of image processing of the audio signal processing device 1h.

Hereinafter, an audio signal processing device 1h in accordance with an eighth modification will be described with reference to the drawings. FIG. 12 is a block diagram showing a functional configuration of a processor 17h of the audio signal processing device 1h. FIG. 13 is a flowchart showing an example of setting of the acoustic parameter SP in the audio signal processing device 1h. FIG. 14 is a view showing an example of image processing in the audio signal processing device 1h.

The audio signal processing device 1h is different from the audio signal processing device 1 in that the audio signal processing device 1h executes determination processing whether or not to output a reflected sound that is reflected on an upper surface of the desk E.

As shown in FIG. 12, the audio signal processing device 1h is provided with a direction detector 176 functionally, in addition to the receiver 170, the obtainer 171, the estimator 172, the setter 173, the signal processor 174, and the outputter 175. The direction detector 176 detects a direction F1 from which a voice comes (FIG. 13: Step S30). For instance, the audio signal processing device 1h is connected to a plurality of microphones (e.g., a microphone 4 and a microphone 4a in FIG. 12) in the present modification. The direction detector 176 calculates cross correlation between audio collection signals (e.g., the audio signal SS1 obtained from the microphone 4 and an audio signal SS1a obtained from the microphone 4a in FIG. 12) of the plurality of microphones, thereby detecting the direction F1.

After Step S30, the estimator 172 performs analysis processing (e.g., analysis processing by using artificial intelligence like the first embodiment or the like) of the first image M1, thereby determining whether a person's head is captured in the first image M1 or not (FIG. 13: Step S31).

When determining that "a person's head is present" (FIG. 13: Yes at Step S31), the estimator 172 calculates a direction F2 of the detected person's head (FIG. 13: Step S32). For instance, in FIG. 14, the estimator 172 estimates the direction F2 of a person H3 based on the first image M1.

After Step S32, the estimator 172 determines whether a desk is captured in the first image M1 or not (FIG. 13: Step S33). Specifically, the estimator 172 executes processing of determining the presence or absence of a desk, described later. In this case, the estimator 172 calculates a position of the desk based on the first image M1. The position of the desk is an example of information (information indicating fixtures in a room) indicating a usage state of a room. Accordingly, in the present modification, the room information RI includes the information indicating a position of a desk.

When determining that "a desk is present" (FIG. 13: Yes at Step S33), the estimator 172 calculates a direction F3 of the desk (FIG. 13: Step S34). For instance, in FIG. 14, a desk E is captured in the first image M1. In this case, the estimator 172 calculates the direction F3 in which the desk E is located.

After Step S34, the estimator 172 determines "whether the direction F1 from which a voice comes is matched with the direction F2 in which a person's head is located" (FIG. 13: Step S35). For instance, in FIG. 14, a voice SH2 of the person H3 directly reaches a microphone connected to the audio signal processing device 1h. In this case, the estimator 172 determines that "the direction F1 is matched with the direction F2 in which a head of the person H3 is located."

When the estimator 172 determines that "the direction F1 is matched with the direction F2" (FIG. 13: Yes at Step S35), the setter 173 performs setting so as not to output the sound coming from the direction F3 (FIG. 13: Step S36). Thus, the audio signal processing device 1h prevents that a voice of the user U is heard like an echo because of being collected a plurality of times belatedly due to a voice SH3 reflected on the desk E.

After Step S36, the setter 173 forms a collection beam having high sensitivity in the direction F1 (FIG. 13: Step S37). Specifically, audio collection signals from the plurality of microphones, which are connected to the audio signal processing device 1h, each are delayed by a predetermined delay amount and synthesized to form the collection beam having high sensitivity in the direction F1. Thus, the audio signal processing device 1h can obtain the voice SH2 of the person H3 clearly. As mentioned above, in the present modification, the setter 173 sets the acoustic parameter SP according to the information (an example of room information) indicating a position of a desk.

When the estimator 172 determines that "a head of a person is absent" in Step S31 (FIG. 13: No at Step S31), the direction detector 176 is likely to detect the voice SH1 (a voice of a person who is not captured in the first image M1 or the like) that comes from an area in which the head of the person is not captured in the first image M1, or sound from a sound source (e.g., sound from a PC shown in FIG. 14 or the like) other than the voice of the person (see FIG. 14). For this reason, when the estimator 172 determines that "a head of a person is absent" (FIG. 13: No at Step S31), the setter 173 performs setting so as to form a collection beam having high sensitivity in the direction F1 (FIG. 13: Step S40). Thus, the audio signal processing device 1h can obtain the voice SH1 (a voice of a person who is not captured in the first image M1) that comes from an area in which a head of a person is not captured in the first image M1 clearly.

In Step S33, when determining that "a desk is absent" (FIG. 13: No at Step S33), the estimator 172 determines "whether or not the direction F1 from which a voice comes is matched with the direction F2 in which a head of a person is located" (FIG. 13: Step S38).

When the estimator 172 determines that "the direction F1 is matched with the direction F2" in Step S38 (FIG. 13: Yes at Step S38), the setter 173 forms the collection beam having high sensitivity in the direction F1 (FIG. 13: Step S40). Thus, the audio signal processing device 1h can clearly obtain the voice SH2 that has arrived directly from the person, rather than the voice SH3 reflected on the upper surface of the desk.

In Step S38, when the estimator 172 determines that "the direction F1 is not matched with the direction F2" (FIG. 13: No at step S38), the setter 173 completes the processing (FIG. 13: END). In other words, the audio signal processing device 1h maintains the current state of the collection beam. If the direction F1 is not matched with the direction F2, the collection beam will be directed to a direction of an area in which a head of a person is not captured in the first image M1. Therefore, the setter 173 maintains the setting of the collection beam to obtain the voice SH1 (a voice of a person who is not captured in the first image M1) that has come from the area in which a head of a person is not captured in the first image M1.

In Step S35, when determining that "the direction F1 is not matched with the direction F2" (FIG. 13: No at Step S38), the estimator 172 determines "whether the direction F1 is matched with the direction F3 or not" (FIG. 13: Step S39).

When the estimator 172 determines that "the direction F1 is matched with the direction F3" in Step S39, a voice of a talker is likely to be reflected on the desk E and collected by a microphone. Alternatively, when the room is seen in a plan view, a talker is likely to be present in the same direction as a direction from which a voice reflected on the desk comes, so that a direct sound from the talker may be collected by the microphone. At this time, if not outputting the voice from the above-mentioned direction, the audio signal processing device 1h will fail to output a voice of the talker present in the direction. For this reason, it may be made difficult for an interlocutor to hear a voice of the talker. Therefore, when the estimator 172 determines that "the direction F1 is matched with the direction F3" (FIG. 13: Yes at Step S39), the setter 173 performs setting so as to form the collection beam having high sensitivity in the direction F1 (FIG. 13: Step S37). Thus, the audio signal processing device 1h can obtain the talker's voice reflected on the desk E clearly.

On the other hand, when the estimator 172 determines that "the direction F1 is not matched with the direction F3" in Step S39 (FIG. 13: No at Step S39), the direction detector 176 completes the processing (FIG. 13: END). In other words, the audio signal processing device 1h maintains the current state of the collection beam. If the direction F1 is not matched with the direction F2 and the direction F1 is not matched with the direction F3, the collection beam will be directed to a direction of the area in which a head of a person is not captured in the first image M1. Accordingly, the setter 173 maintains the setting of the collection beam and obtains the voice SH1 (a voice of a person who is not captured in the first image M1) that comes from the area in which a head of a person is not captured in the first image M1.

Effect

The audio signal processing device 1h makes it easy for an interlocutor to hear a voice of the user U. The audio signal processing device 1h sets a delay amount (acoustic parameter SP) so as not to collect a voice reflected on the desk. For instance, this makes it difficult for the audio signal processing device 1h to output a voice of the person H3 reflected on the desk E in FIG. 14. In this case, the audio signal processing device 1h prevents that a voice of the user U is heard like an echo because of being collected a plurality of times belatedly due to the voice reflected on the desk E.

Therefore, this makes it easy for an interlocutor to hear a voice of the person H3 clearly.

(Processing of Determining Presence or Absence of Desk)

Hereinafter, processing (hereafter, referred to as processing Z) of determining the presence or absence of a desk in the audio signal processing device 1*h* will be described. By analyzing color distribution of the first image M1, the audio signal processing device 1*h* determines the presence or absence of a desk. Specifically, the audio signal processing device 1*h* divides the first image M1 into a plurality of areas (e.g., 100×100 pixels or the like), as shown by the dashed line of FIG. 14. The audio signal processing device 1*h* applies processes (1) to (9), which are described in the following, to each of the divided areas in sequence.

(1): Calculate an average RGB value (hereafter, referred to as a first average value) of all the pixels in each area.

(2): In a first (bottom line) line among a plurality of lines, calculate the number of areas (hereafter, referred to as a first area)) whose RGBs are within a range that can be considered to have the same color. The range, which can be considered to have the same color, means that each area is within a range of medium value±α (α is an optional value) of the first average value in the line, for example. In other words, when each area is within the range: medium value−α<the first average value<medium value+α, consider that the area is the first area.

(3): When a ratio of the number of first areas to the number of all the areas in the first line is more than or equal to a first threshold (e.g., 80% or more or the like), determine that the desk E is captured in the first line. When the ratio of the number of first areas to the number of all the areas is less than the first threshold, determine that the desk E is not captured.

(4): In (3), when it is determined that the desk E is not captured, repeat the processes of (2) to (3) in a line next to the line in which the above-mentioned determination is performed. For instance, when it is determined that the desk E is not captured in the first line, perform the processes of (2) to (3) in a second line.

(5): In (3), when it is determined that the desk E is captured, calculate an average RGB value (hereafter, referred to as a second average) of all the first areas.

(6): In a line next to the line in which it is determined that the desk E is captured, calculate the number of areas (hereafter, referred to as a second area) having the same degree of color as that of the second average. The same degree of color means that the color is within a range of the second average value±Δ (Δ is an optional value), for example. In other words, when each area is within the range: the second average value−Δ<the first average value<the second average value+Δ, consider that the area is the second area.

(7): When a ratio of the number of second areas to the number of all the areas in the line is more than or equal to a second threshold (e.g., 60% or more or the like), determine that the desk E is captured in the line. The second threshold is less than the first threshold.

(8): Hereinafter, repeat the processes of (5) to (7) in the remaining lines.

(9): In (8), when it is determined that the desk E is not captured in the line, complete the processing of determining the presence or absence of the desk E. Thus, the audio signal processing device 1*h* ensures a range of the desk E captured in the first image M1 (area in which the desk E is captured).

Effect

The audio signal processing device 1*h*, which executes the processing Z, determines the presence or absence of the desk E for every area rather than for every pixel. In this case, a load of the audio signal processing device 1*h* becomes small as compared with the case where the presence or absence of the desk E is determined for every pixel.

The desk E has sometimes the same color. In other words, a color of the desk E captured in the previous line is likely to be the same as that of the desk E captured in the next line. Then, the audio signal processing device 1*h*, which executes the processing Z, reflects a calculation result (calculation result of the average RGB value of the first area in which the presence of the desk E is determined in the previous line) of the previous line on calculation (whether the next line is the second area or not) of the next line. In other words, based on the color (average RGB value of the first area in which the presence of the desk E is determined in the previous line) of the desk E that is specified in the previous line, the audio signal processing device 1*h* determines whether or not the desk E is captured in each area of the next line (the presence or absence of the desk E is determined based on similarity of the color). Accordingly, detection accuracy of the desk E in the audio signal processing device 1*h* is improved.

A photographed object becomes smaller as the distance therefrom is farther. Therefore, the desk E of a rectangular shape is captured as a trapezoidal shape. In the first image M1, a width of the desk E captured in an upper line is smaller than a width of the desk E captured in a lower line. Accordingly, the number of areas in which the desk E is captured is decreased as it goes upper. Then, the audio signal processing device 1*h* sets the second threshold less than the first threshold (sets a threshold corresponding to a feature of the desk E captured as a trapezoidal shape), and determines whether or not the desk is captured in each line. Thus, detection accuracy of the desk E in the audio signal processing device 1*h* is improved.

Note that, the audio signal processing device 1*h* may change the processing of a voice beam for every area in which the presence of the desk E is determined. For instance, a voice is reflected on the center of the desk E more easily than an end of the desk E. Accordingly, the audio signal processing device 1*h* determines "whether the center of the desk E is present or an end of the desk E is present" for every area in which the presence of the desk E is determined. The audio signal processing device 1*h* executes the processes (Seps S34, S35, S36, S37, and S39), which are based on the flow shown in FIG. 13, for each area in which it is determined that "the center of the desk is present." On the other hand, the audio signal processing device 1*h* does not execute the processing of a voice beam for each area in which it is determined that "an end of the desk E is present." In this way, the audio signal processing device 1*h* can perform the processing of a voice beam appropriately for every area in which the presence of the desk E is determined.

Note that, the audio signal processing device 1*h* may calculate a reflection angle of a voice for every area in which the presence of the desk E is determined (e.g., calculate by analysis processing of the first image M1) and execute the processing of a voice beam based on the calculated reflection angle. For instance, a reflection angle of a voice from a standing talker becomes small. A microphone hardly collects a voice with a small reflection angle (a voice from a direction in which the microphone has no directivity). Therefore, the audio signal processing device 1*h* does not output a voice (hardly collected voice) with a small reflection angle. Thus, an interlocutor is prevented from feeling difficulty in hearing the voice. On the other hand, a voice from a sitting talker has a large reflection angle. In this case, a reflected voice and a direct voice coming from the talker directly can be considered to have the same direction (considered to satisfy a relationship of direction F1≈direction F3). Therefore, the audio signal processing device 1h forms a collection beam so as to collect a voice with a large reflection angle.

Note that, frequency characteristics of a voice collected by a microphone are likely to be changed depending on a voice coming direction. For instance, if a voice reflected on the desk E and a voice coming from the talker directly interfere with each other, the frequency characteristics will likely be changed. Accordingly, the audio signal processing device 1h may change a parameter of an equalizer based on the voice coming direction for every area in which the presence of the desk E is determined. Thus, the audio signal processing device 1h can output an easily heard voice for an interlocutor.

Note that, the audio signal processing device 1h may determine whether or not to output a voice based on a distance (hereafter, referred to as a distance between a microphone and a reflection position) between a microphone and a position at which a voice is reflected on the desk E. For instance, if a voice is reflected at a position near a microphone, the voice can be considered to be the same as a direct voice coming from a talker directly (considered to satisfy the relationship of F1≈F3). Accordingly, the audio signal processing device 1h calculates the distance between a microphone and a reflection position for every area in which the presence of the desk E is determined. When determining that "the distance between a microphone and a reflection position is short (less than or equal to an optional threshold previously set in the audio signal processing device 1h)," the audio signal processing device 1h does not execute the processing of a voice beam for this area. Thus, a processing load in the audio signal processing device 1h is reduced as compared with the case where the processing of a voice beam is executed for all the areas in which the presence of the desk E is determined.

Note that, the configurations of audio signal processing devices 1, 1a, 1b, 1c, 1d, 1e, 1f, 1g and 1h may be combined optionally.

What is claimed is:

1. An audio signal processing method comprising:
obtaining a first image;
estimating room information based on the obtained first image;
setting an acoustic parameter according to the estimated room information;
receiving an audio signal;
obtaining a second image at a timing different from a timing when the first image is obtained;
estimating the room information from the obtained second image;
changing the set acoustic parameter based on the estimated room information estimated from the second image;
applying sound processing to the audio signal according to the changed set acoustic parameter; and
outputting the audio signal subjected to the sound processing.

2. The audio signal processing method according to claim 1, further comprising changing the acoustic parameter based on the audio signal subjected to the sound processing.

3. The audio signal processing method according to claim 2, wherein the changing changes the acoustic parameter during a predetermined period.

4. The audio signal processing method according to claim 1, wherein:
the room information includes space information indicating an open space or a closed space, and
the setting sets the acoustic parameter based on the space information.

5. The audio signal processing method according to claim 1, wherein:
the room information includes at least one of a size of a room, a shape of a room, a material quality, a numerical quantity of people, a numerical quantity of chairs, or a shape of a desk, and
the setting sets the acoustic parameter according to at least one of the size of the room, the shape of the room, the material quality, the numerical quantity of people, the numerical quantity of chairs, or the shape of the desk.

6. The audio signal processing method according to claim 1, wherein the sound processing includes at least one of noise reduction, gain adjustment, reverberation removal, or reverberation addition.

7. The audio signal processing method according to claim 1, wherein:
the room information includes desk information indicating a position of a desk, and
the acoustic parameter is set according to the desk information.

8. The audio signal processing method according to claim 1, wherein the applying applies the sound processing using a learned model that has learned a relationship between a first audio signal and a second audio signal by machine learning, the second audio signal being obtained by removing noise from the first audio signal.

9. The audio signal processing method according to claim 1, wherein the estimating estimates the room information using a learned model that has learned a relationship between an input image and the room information by machine learning.

10. An audio signal processing device comprising:
a memory storing instructions; and
a processor configured to implement the instructions to execute a plurality of tasks, including:
an obtaining task that obtains a first image;
an estimating task that estimates room information based on the obtained first image;
a setting task that sets an acoustic parameter according to the estimated room information;
a receiving task that receives an audio signal,
wherein the obtaining task obtains a second image at a timing different from a timing when the first image is obtained,
wherein the estimating task estimates the room information from the obtained second image, and
wherein the setting task changes the set acoustic parameter based on the estimated room information estimated from the second image;
a signal processing task that processes the audio signal according to the changed set acoustic parameter; and
an outputting task that outputs the audio signal subjected to the sound processing.

11. The audio signal processing device according to claim 10, wherein the signal processing task changes the acoustic parameter based on the audio signal subjected to the sound processing.

12. The audio signal processing device according to claim 11, wherein the signal processing task changes the acoustic parameter during a predetermined period.

13. The audio signal processing device according to claim 10, wherein:
the room information includes space information indicating an open space or a closed space, and
the setting task sets the acoustic parameter based on the space information.

14. The audio signal processing device according to claim 10, wherein:
the room information includes at least one of a size of a room, a shape of a room, a material quality, a numerical quantity of people, a numerical quantity of chairs, or a shape of a desk, and
the setting task sets the acoustic parameter according to at least one of the size of the room, the shape of the room, the material quality, the numerical quantity of people, the numerical quantity of chairs, or the shape of the desk.

15. The audio signal processing device according to claim 10, wherein the processing performed by the sound processing task includes at least one of noise reduction, gain adjustment, reverberation removal, or reverberation addition.

16. The audio signal processing device according to claim 10, wherein:
the room information includes desk information indicating a position of a desk, and
the setter sets the acoustic parameter according to the desk information.

17. The audio signal processing device according to claim 10, wherein the signal processing task processes the audio signal according to the set acoustic parameter using a learned model that has learned a relationship between a first audio signal and a second audio signal by machine learning, the second audio signal being obtained by removing noise from the first audio signal.

18. The audio signal processing device according to claim 10, wherein the estimating task estimates the room information using a learned model that has learned a relationship between an input image and the room information by machine learning.

* * * * *